US011948732B2

(12) United States Patent
Li et al.

(10) Patent No.: US 11,948,732 B2
(45) Date of Patent: Apr. 2, 2024

(54) COMPRESSION-MOLDING METHOD AND DEVICE FOR PERMANENT MAGNET

(71) Applicant: HUAZHONG UNIVERSITY OF SCIENCE AND TECHNOLOGY, Hubei (CN)

(72) Inventors: Liang Li, Hubei (CN); Yiliang Lv, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 18/351,436

(22) Filed: Jul. 12, 2023

(65) Prior Publication Data

US 2023/0377797 A1 Nov. 23, 2023

Related U.S. Application Data

(62) Division of application No. 17/434,415, filed as application No. PCT/CN2020/133576 on Dec. 3, 2020, now Pat. No. 11,756,729.

(30) Foreign Application Priority Data

May 25, 2020 (CN) ......................... 202010448125.6

(51) Int. Cl.

*B22F 3/087* (2006.01)
*B22F 3/00* (2021.01)
*H01F 41/02* (2006.01)

(52) U.S. Cl.

CPC .......... *H01F 41/0266* (2013.01); *B22F 3/003* (2013.01); *B22F 3/087* (2013.01); *B22F 2202/05* (2013.01)

(58) Field of Classification Search

None

See application file for complete search history.

(56) References Cited

FOREIGN PATENT DOCUMENTS

| | | | |
|---|---|---|---|
| CN | 201707998 | | 1/2011 |
| CN | 103846431 A | * | 6/2014 |

OTHER PUBLICATIONS

Machine translation of CN 103846431A. (Year: 2014).*

(Continued)

*Primary Examiner* — Xiaowei Su

(74) *Attorney, Agent, or Firm* — JCIP GLOBAL INC.

(57) ABSTRACT

A compression-molding method for a permanent includes: providing a drive coil to generate an electromagnetic force when a transient current is passed into the drive coil, so as to apply a molding compression force to magnetic powder under compression, and providing an orientation coil to generate an orientation magnetic field when a transient current is passed into the orientation coil, thereby providing the magnetic powder under compression with an anisotropic property; and synchronously passing the transient currents to the drive coil and the orientation coil to synchronously generate the electromagnetic force and the orientation magnetic field, thereby completing compression-molding of the permanent magnet, wherein a magnitude of the electromagnetic force and an intensity of the orientation magnetic field are respectively changed by changing peak values of the transient currents.

9 Claims, 4 Drawing Sheets

(56) References Cited

OTHER PUBLICATIONS

Machine translation of CN201707998U. (Year: 2017).*
"International Preliminary Report on Patentability (Form PCT/IB/373) of PCT/CN2020/133576," completed on Nov. 17, 2022, with English translation thereof, pp. 1-10.

* cited by examiner

COMPRESSION-MOLDING METHOD AND DEVICE FOR PERMANENT MAGNET

CROSS-REFERENCE TO RELATED APPLICATION

This is a divisional application of and claims the priority benefit of U.S. application Ser. No. 17/434,415, filed on Aug. 27, 2021, now allowed. The prior U.S. application Ser. No. 17/434,415 is a 371 application of an International PCT application serial no. PCT/CN2020/133576, filed on Dec. 3, 2020, which claims the priority benefits of China Application No. 202010448125.6, filed on May 25, 2020. The entirety of each of the above-mentioned patent applications is hereby incorporated by reference herein and made a part of this specification.

BACKGROUND

Technical Field

The invention relates to compression-molding of a permanent magnet, and more particularly relates to a compression-molding method and device for a permanent magnet.

Description of Related Art

Currently, the industrial processes of manufacturing permanent magnets include sintering, bonding, casting, and thermal compression/deformation. Among these processes, the sintering process is applied most widely. Most sintered permanent magnets are anisotropic magnets. A sintered permanent magnet is formed by placing magnetic powder in a loose state in the mold cavity of a compression device, molding the magnetic powder under an externally applied orientation magnetic field and pressure, and performing a sintering process to form a sintered permanent magnet after subjecting the magnetic powder to orientation and compression-molding.

A bonding process includes placing the mixture of magnetic powder and a binder in the mold cavity of a compression device to mold the mixture under a pressure. Such process does not require sintering. If the magnetic powder is not subjected to an orientation magnetic field during the compression process, the magnetic powder may form an isotropic bonded permanent magnet with less favorable magnetic properties after compression-molding. If the magnetic powder is subjected to an orientation magnetic field during the compression process, the magnetic powder may form an anisotropic bonded permanent magnet after compression-molding. The compression-molding process of the bonded permanent magnet is the same as that of the sintered permanent magnet.

The magnetic properties of a permanent magnet are closely related to the orientation magnetic field and the compression force during the compression-molding process. In general, the greater the intensity of the orientation magnetic field, the higher the orientation degree of the permanent magnet, the greater the compression force, the greater the density of the permanent magnet, and the orientation degree and the magnet density determine the magnetic properties of the permanent magnet.

In the conventional orientation and compression-molding process for permanent magnets, the orientation magnetic field is generally provided by using an electromagnet or a permanent magnetic circuit. In order for the orientation magnetic field to achieve the desired intensity, the electromagnet tends to have a large size. As a result, the compression device may have a large overall size, a complicated structure, and require a high cost. Moreover, once saturated, the intensity of the magnetic field of the electromagnet cannot be further increased. As a result, the magnetic properties of the permanent magnet are limited.

SUMMARY

The invention provides a compression-molding method and device for a permanent magnet to solve the technical issues that the conventional compression-molding processes for a permanent magnet are unable to satisfy practical needs in the processes due to a large size of the manufacturing structure and the limited magnet properties.

The technical solution for solving the above technical issues is as follows. A compression-molding method for a permanent magnet includes:

providing a drive coil to generate an electromagnetic force when a transient current is passed into the drive coil, so as to apply a molding compression force to magnetic powder under compression, and providing an orientation coil to generate an orientation magnetic field when a current is passed into the orientation coil, thereby providing the magnetic powder under compression with an anisotropic property; and synchronously passing the transient currents to the drive coil and the orientation coil to synchronously generate the electromagnetic force and the orientation magnetic field, thereby completing compression-molding of the permanent magnet, wherein a magnitude of the electromagnetic force and an intensity of the orientation magnetic field are respectively changed by changing parameters of the transient currents.

The beneficial effect of the invention is as follows. The method adopts the electromagnetic coil to generate the orientation magnetic field, and is able to generate the waveform and the magnitude of the magnetic field as required by adjusting, based on needs, the parameter of the current being passed into. Accordingly, the orientation magnetic field may be high, and the orientation degree of the permanent magnet can be increased. Meanwhile, the intensity of the magnetic field generated by the orientation coil may be determined by the current being passed into. Consequently, the issue that the magnetic field intensity cannot be further increased once saturation is reached no longer exists, and the magnetic properties of the permanent magnet formed through compression-molding can be improved. Besides, the magnetic powder is compressed by a compression tool driven by the electromagnetic force generated by the electromagnetic coil. Accordingly, a large compression force may be generated based on needs. As a result, the density of the permanent magnet is increased. Furthermore, by adopting the transient process, the time which the entire compression-molding process takes is short, and the power consumption is low. As a result, the cost can be reduced. Therefore, the method improves the properties of the permanent magnet formed by compression-molding, and solves the issue that the size of the electromagnet tends to be large and the issue that the orientation magnetic field intensity cannot be further increased in the conventional compression-molding technologies for permanent magnets. Thus, the method meets the practical demands gradually increasing in the industry.

On the basis of the above technical solution, the following modifications may also be made to the invention.

Additionally, the drive coil includes two drive coil sets. In a compression process, transient currents passed into the two drive coil sets are in opposite directions, so that an electromagnetic repulsive force is generated between the two drive coil sets. The repulsive force drives one of the drive coil sets to drive the compression tool to apply the molding compression force to the magnetic powder under compression.

The additional beneficial effect of the invention is that, in the compression process, the directions of the transient currents passed into the two drive coil sets are opposite, and when the two drive coil sets are close to each other, a great electromagnetic repulsive force is generated, and the compression tool is driven to apply the molding compression force to the magnetic powder under compression. In addition, the transient current passed into the orientation coil may be in the same direction with the transient current passed into one of the drive coils driving the compression tool. Accordingly, an attractive force is generated therebetween, and the molding compression force applied to the magnetic powder under compression is further increased. Accordingly, the method is highly flexible and exhibits high compression efficiency.

Preferably, the drive coil is a drive coil set. In a compression process, the transient currents synchronously passed into the drive coil set and the orientation coil are in a same direction. An electromagnetic attractive force is generated between the drive coil and the orientation coil. The attractive force drives the drive coil set to drive the compression tool to apply the molding compression force to the magnetic powder under compression.

The additional beneficial effect of the invention is that, in the compression process, the compression-molding of the magnetic powder under compression is realized by using only one drive coil set. Accordingly, the size of the compression structure is significantly reduced.

Furthermore, the drive coil is a drive coil set, and a drive plate is provided on a side of the drive coil. In a compression process, when the transient current is passed into the drive coil set, an eddy current is generated in the drive plate, so that an electromagnetic repulsive force is generated between the drive coil set and the drive plate, thereby driving the compression tool to apply the molding compression force to the magnetic powder under compression.

The additional beneficial effect of the invention is that, with the assistance of the drive plate, a repulsive force is generated between the drive coil and the drive plate when the transient current is passed into the drive coil. Accordingly, the molding-compression of the magnetic powder under compression is realized effectively.

Additionally, the repulsive force drives the drive plate to drive the compression tool to apply the molding compression force to the magnetic powder under compression.

Additionally, the repulsive force drives the drive coil set to drive the compression tool to apply the molding compression force to the magnetic powder under compression.

Additionally, the currents synchronously passed into the drive coil set and the orientation coil are in a same direction, so that an attractive force is generated between the drive coil and the orientation coil. The attractive force and the repulsive force jointly drive the drive coil set to drive the compression tool to provide the compression force to the magnetic powder under compression.

The additional beneficial effect of the invention is that, when the drive coil is adopted to directly drive the compression tool to move, the compression force applied to the magnetic powder under compression may be further increased by using the orientation coil. As a result, the compression effect is facilitated.

Preferably, a cross-section of the compression tool in an axial direction is in a T shape, and a bottom of the T shape contacts the magnetic powder under compression.

The additional beneficial effect of the invention is that, since the surface area of the groove in the mold is small, to ensure the compression tool exerts a great pressure on the magnetic powder under compression, a compression tool whose cross-section in the axial direction is T-shaped is adopted. Accordingly, the contact surface of the drive coil or the drive plate with the top of the compression tool is increased, thereby making the compression more efficient.

Furthermore, the drive coil and the orientation coil are both hollow spiral coils and are arranged on a same central axis. The orientation coil is sleeved on an outer periphery of the magnetic powder under compression.

The additional beneficial effect of the invention is that, the drive coil and the orientation coil are arranged on the same central axis. This ensures that the direction of the electromagnetic force generated by the compression tool drive coil coincides with the axial direction of the compression tool and the electromagnetic force is vertically applied to the surface of the magnetic powder under compression. Accordingly, the compression efficiency is improved.

The invention also provides a compression-molding device for a permanent magnet including a drive module, a compression tool, a mold, and an orientation coil.

A groove configured to be filled with magnetic powder under compression is provided at a center of the mold. A bottom of the compression tool contacts the magnetic powder under compression, a top of the compression tool contacts an end of the drive module, and the compression tool coincides with a central axis of the groove, The drive module is configured to generate the electromagnetic force according to the compression-molding method for the permanent magnet, so as to drive the compression tool to apply the molding compression force to the magnetic powder under compression, The orientation coil is sleeved on the outer periphery of the mold to generate the orientation magnetic field as described in the compression-molding method for the permanent magnet.

BRIEF DESCRIPTION OF THE DRAWINGS

In the accompanying drawings, like reference symbols serve to represent like components or structures, wherein.

1: first drive coil; 2: second drive coil; 3: drive plate; 4: compression tool; 5: orientation coil; 6: magnetic powder under compression; 7: mold; 8: base.

DESCRIPTION OF THE EMBODIMENTS

In order to more clearly describe the objectives, technical solutions, and advantages of the invention, the following describes the invention in greater detail with reference to the accompanying drawings and embodiments. It should be understood that the detailed embodiments described herein only serve to explain the invention and shall not be construed as limitations on the invention. Moreover, the technical features involved in the respective embodiments of the invention may be combined with one another as long as they do not conflict with one another.

Embodiment 1

Figure 1:
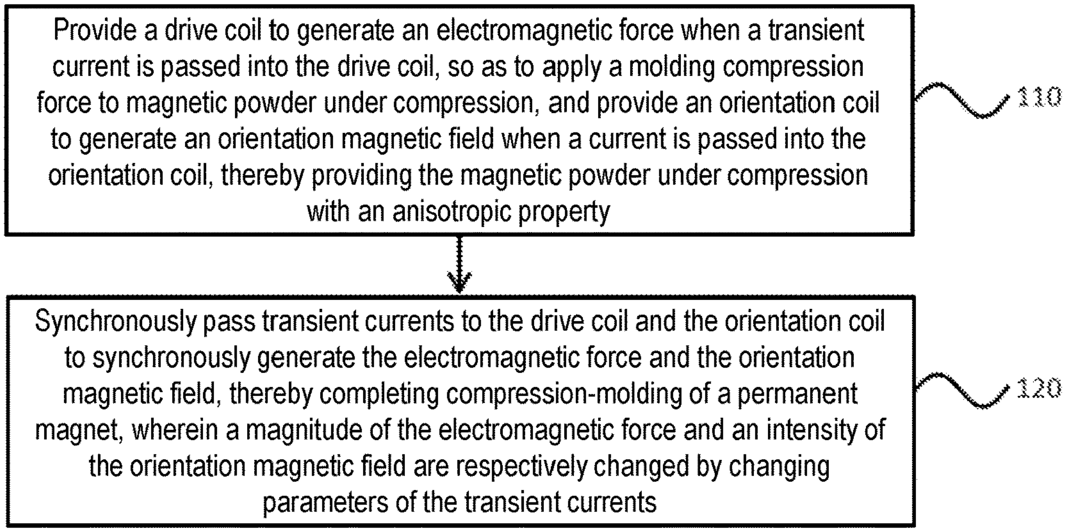
FIG. 1 is a flowchart illustrating a compression-molding method for a permanent magnet according to an embodiment of the invention.

A compression-molding method 100 for a permanent magnet, as shown in FIG. 1, includes:

Step 110: providing a drive coil to generate an electromagnetic force when a transient current is passed into the drive coil, so as to apply a molding compression force to magnetic powder under compression; and providing an orientation coil to generate an orientation magnetic field when a current is passed into the orientation coil, thereby providing the magnetic powder under compression with an anisotropic property; and Step 120: synchronously passing transient currents to the drive coil and the orientation coil to synchronously generate an electromagnetic force and the orientation magnetic field, thereby completing compression-molding of a permanent magnet, wherein a magnitude of the electromagnetic force and an intensity of the orientation magnetic field are respectively changed by changing parameters of the transient currents.

The orientation magnetic field and the electromagnetic force are generated by using electromagnetic coils. The electromagnetic force is generated to perform compression-molding on the magnetic powder under compression, and the magnetic powder compression is, in general, permanent magnet alloy powder.

The method adopts the electromagnetic coil to generate the orientation magnetic field, and is able to generate the waveform and the magnitude of the magnetic field as required by adjusting, based on needs, the parameter of the current being passed into. Accordingly, the orientation magnetic field may be high, and the orientation degree of the permanent magnet can be increased. Meanwhile, the intensity of the magnetic field generated by the orientation coil may be determined by the peak value of the current passed into. Therefore, the issue that the magnetic field intensity cannot be further increased once saturation is reached no longer exists. Consequently, the magnetic properties of the permanent magnet formed through compression-molding can be improved. Besides, the magnetic powder is compressed by a compression tool driven by an electromagnetic force generated by using the electromagnetic coil. Accordingly, a large compression force may be generated based on needs, and the density of the permanent magnet is increased. Furthermore, by adopting the transient process, the time which the entire compression-molding process takes is very short, and the power consumption is low. Thus, the cost can be reduced. Consequently, the method improves the properties of the permanent magnet formed by compression-molding, and solves the issue that the size of the electromagnet tends to be large and the issue that the orientation magnetic field intensity cannot be further increased in the conventional compression-molding technologies for permanent magnets.

There are three types of sources for the electromagnetic force of the method. In the first type, the drive coil is used with a drive plate, and when the drive coil generates a transient magnetic field, a reverse induction eddy current is generated on the drive plate, and an electromagnetic repulsive force is generated between the drive coil and the drive plate. In the second type, the drive coil is formed by two coils, transient currents in opposite directions are respectively passed into the two drive coils, and an electromagnetic repulsive force is generated between the drive coil. In the third type, transient currents in the same direction are passed into the drive coil and the orientation coil, and an electromagnetic attractive force is generated between the drive coil and the orientation coil.

Preferably, the drive coil is a drive coil set, and the drive plate is provided on a side of the drive coil. In the compression process, when the transient current is passed into the drive coil set, an eddy current is generated in the drive plate, so that an electromagnetic repulsive force is generated between the drive coil set and the drive plate, thereby driving the compression tool to apply the molding compression force to the magnetic powder under compression.

The repulsive force may drive the drive plate, so as to drive the compression tool to apply the molding compression force to the magnetic powder under compression. Alternatively, the repulsive force may drive the drive coil set, so as to drive the compression tool to apply the molding compression force to the magnetic powder under compression. When the repulsive force drives the drive coil set to drive the compression tool to apply the molding compression force to the magnetic powder under compression, the transient currents synchronously passed into the drive coil set and the orientation coil are in the same direction. Therefore, an attractive force is generated between the drive coil and the orientation coil. The attractive force and the repulsive force jointly drive the drive coil set, so as to drive the compression tool to provide the compression force to the magnetic powder under compression.

Figure 2:
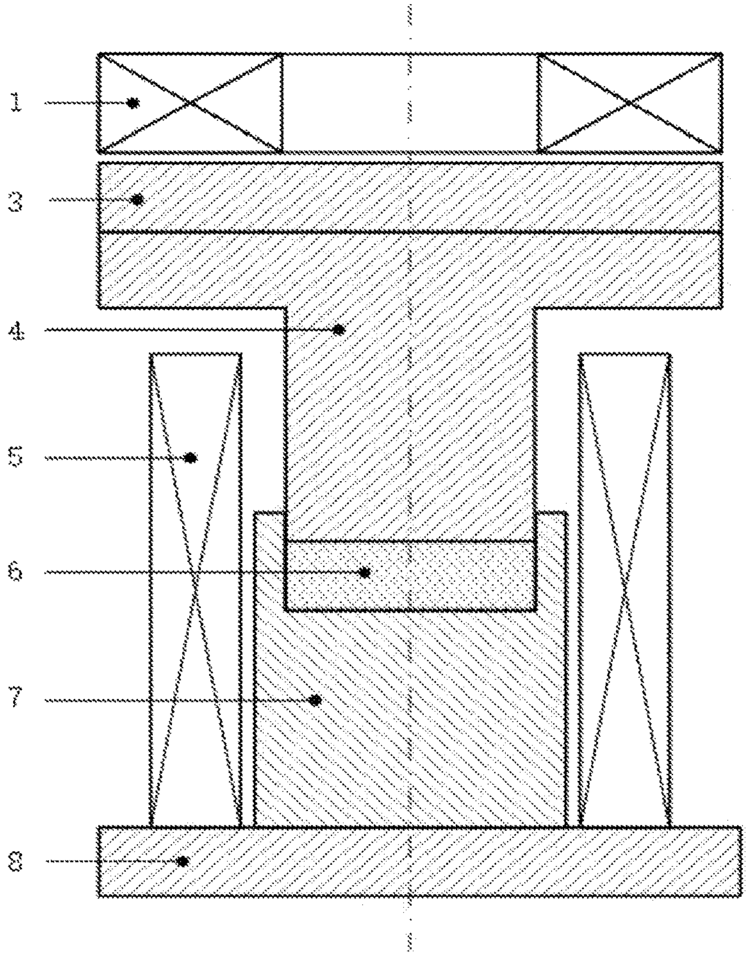
FIG. 2 is a view illustrating a compression-molding device corresponding to another compression-molding method according to an embodiment of the invention.

To better describe this example, for example, in a device shown in FIG. 2, an orientation coil 5 and a mold 7 are fixed onto a base 8, magnetic powder 6 under compression is placed in a groove at the top of the mold, the bottom of a compression tool 4 is placed into the groove, and a drive plate 3 is a metal plate. Meanwhile, to ensure that the drive plate is able to favorably transmit power to the compression tool, the drive plate and the compression tool are integrated by bonding, and the first drive coil 1 is moved to the above of the drive plate to approach the drive plate and be fixed.

In order to synchronously generate the orientation magnetic field and the compression force, a first drive coil and the orientation coil are connected in series in the embodiment, and a capacitor power supply is adopted to discharge power thereto. During the power discharge, an eddy current is generated through induction on the drive plate, thereby generating a downward electromagnetic force which pushes the compression tool to generate the compression force. At the same time, the orientation coil generates the orientation magnetic field in the mold. The intensity of the orientation magnetic field and the magnitude of the compression force may be adjusted by setting the initial discharge voltage of the capacitor power supply. Accordingly, a high orientation magnetic field and a high compression force can be achieved easily. The discharge process is within hundreds of microseconds to several milliseconds. After the power discharge ends, the permanent magnet is compressed and molded.

Figure 3:
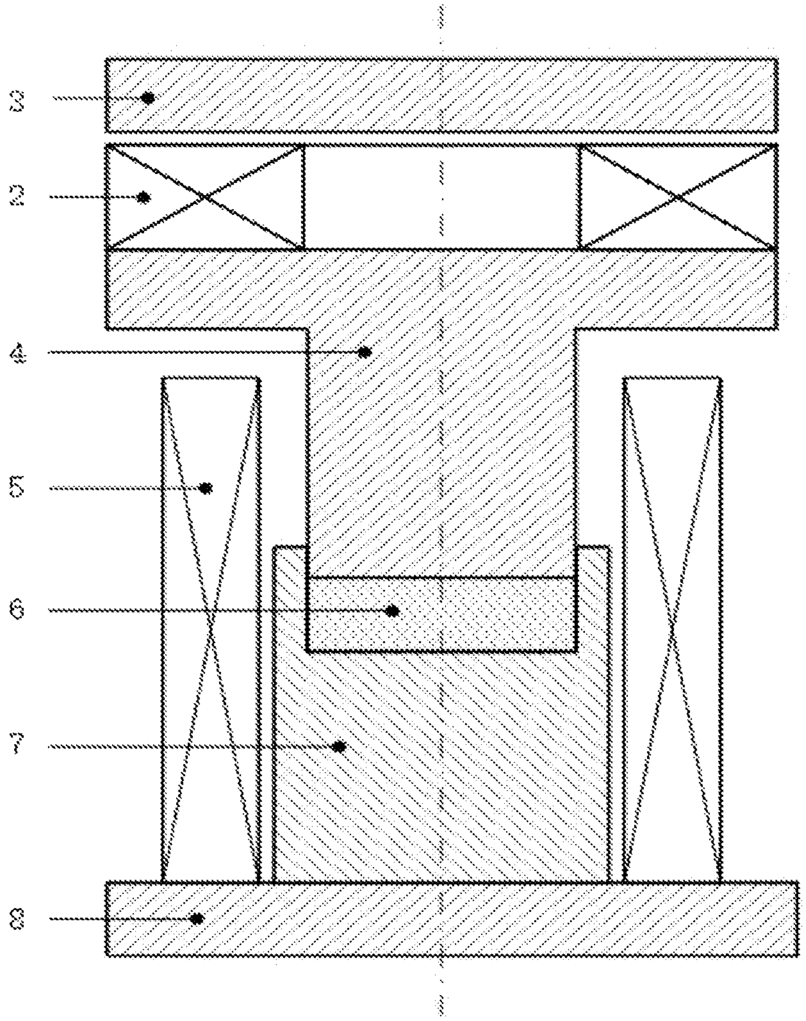
FIG. 3 is a view illustrating a compression-molding device corresponding to another compression-molding method according to an embodiment of the invention.

Besides, an electromagnetically-driven orientation and compression-molding device for a permanent magnet as shown in FIG. 3 differs from the embodiment above is that the drive plate is fixed to the top, and a second drive coil 2 is integrated and moved along with the compression tool. In the embodiment, the current directions of the second drive coil and the orientation coil should be the same. When the capacitor power supply is adopted to discharge power to the second drive coil and the orientation coil, an eddy current is generated through induction on the drive plate. An electromagnetic repulsive force is generated on the second drive coil, and an electromagnetic attractive force is generated by the orientation coil to the second drive coil. The electromagnetic repulsive force and the electromagnetic attractive force jointly drive the compression tool to move downward and compress the magnetic powder in the mold.

Preferably, the drive coil is a drive coil set. In the compression process, the transient currents synchronously passed into the drive coil set and the orientation coil are in the same direction. An electromagnetic attractive force is generated between the drive coil and the orientation coil. The electromagnetic attractive force drives the drive coil set to drive the compression tool to apply the molding compression force to the magnetic powder under compression.

Figure 4:
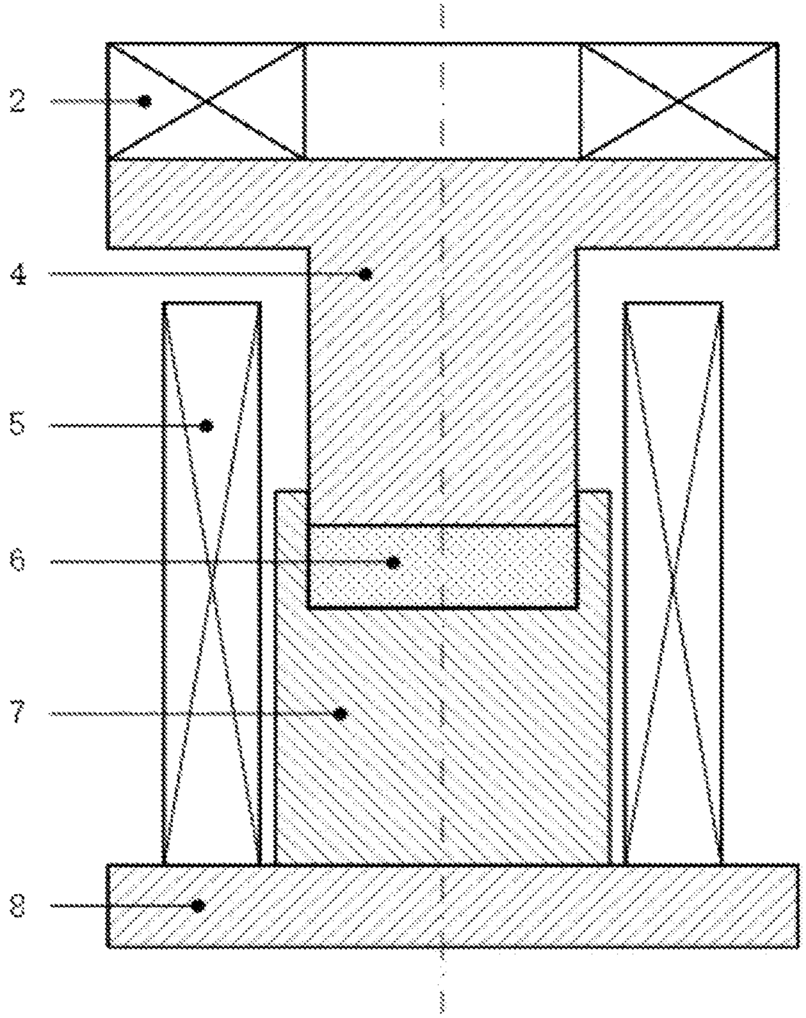
FIG. 4 is a view illustrating a compression-molding device corresponding to another compression-molding method according to an embodiment of the invention.

To better describe this example, for example, an electromagnetically-driven orientation and compression-molding device for a permanent magnet as shown in FIG. 4 differs from the above example in that the drive plate is not required. The current directions of the second drive coil and the orientation coil should be the same. When the capacitor power supply is adopted to discharge power to the second drive coil and the orientation coil, the orientation coil generates an electromagnetic attractive force to the second drive coil. The electromagnetic force drives the compression tool to move downward and compress the magnetic powder in the mold.

Preferably, the drive coil includes two drive coil sets. In the compression process, the transient currents passed into the two drive coil sets are in opposite directions. Accordingly, an electromagnetic repulsive force is generated between the two drive coil sets. The electromagnetic repulsive force drives one of the drive coil sets to drive the compression tool to apply the molding compression force to the magnetic powder under compression.

Figure 5:
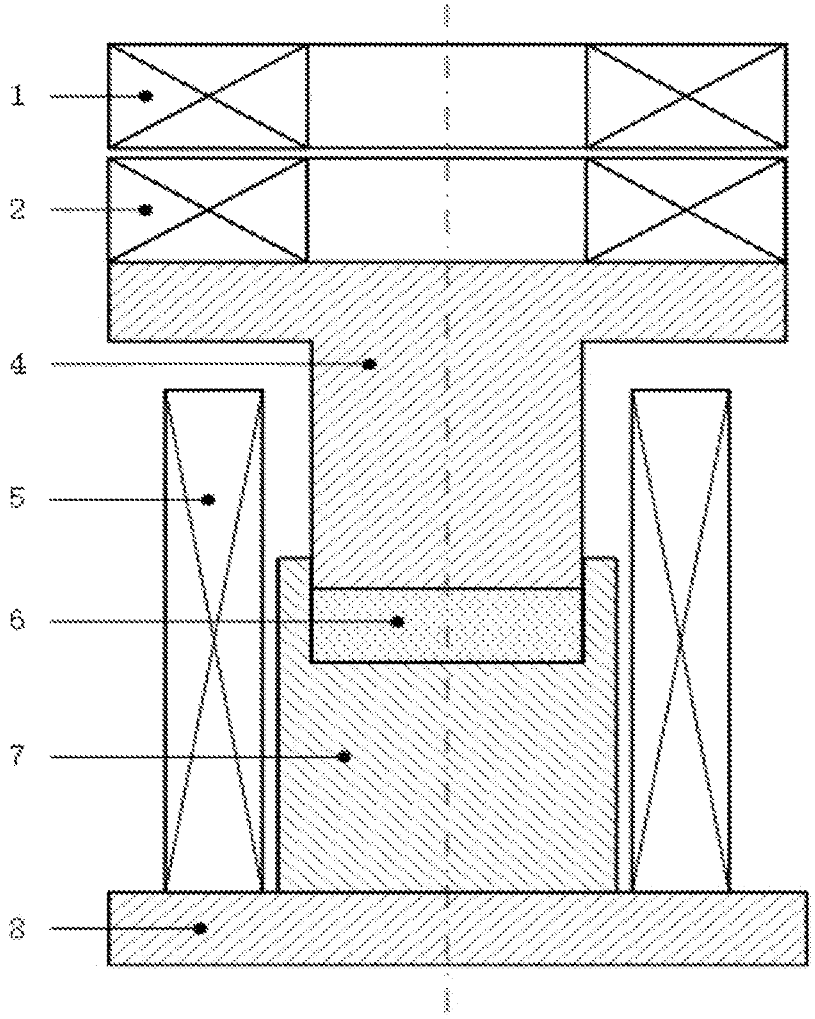
FIG. 5 is a view illustrating a compression-molding device corresponding to another compression-molding method according to an embodiment of the invention.

To better describe this example, in an electromagnetically-driven orientation and compression-molding device for a permanent magnet as shown in FIG. 5, for example, the drive coil is formed by two coils, which are respectively a first drive coil and a second drive coil. The first drive coil is fixed to the top, and the second drive coil is integrated and moved with the compression tool. Pulse currents in opposite directions are passed into the first drive coil and the second drive coil by using the capacitor power supply, and an electromagnetic repulsive force is generated between the drive coils. The second drive coil and the compression tool move downward and compress the magnetic powder in the mold.

It should be noted that each drive coil set may be formed by one or more coils connected in series.

Preferably, as shown in FIGS. 2 to 5, the cross-section of the compression tool in the axial direction is in a T shape, and the bottom of the T shape contacts the magnetic powder under compression. The surface area of the groove in the mold is small. Therefore, to ensure the compression tool exerts a greater pressure on the magnetic powder under compression, a compression tool whose cross-section in the axial direction is T-shaped is adopted. Accordingly, the contact surface between the drive coil or the drive plate with the top of the compression tool is increased. As a result, the compression becomes more efficient.

Preferably, the drive coil and the orientation coil are both hollow spiral coils and are arranged on the same central axis. The orientation coil is sleeved on the outer periphery of the magnetic powder under compression. The drive coil and the orientation coil arranged on the same central axis ensures that the direction of the electromagnetic force generated by the compression tool drive coil coincides with the axial direction of the compression tool and, and the electromagnetic force is vertically applied to the surface of the magnetic powder under compression. Accordingly, the compression efficiency is improved.

Embodiment 2

A compression-molding device for a permanent magnet includes a drive module, a compression tool, a mold, and an orientation coil. A groove to be filled with the magnetic powder under compression is provided at the center of the mold. The bottom of the compression tool contacts the magnetic powder under compression, the top of the compression tool contacts an end of the drive module, and the compression tool coincides with a central axis of the groove. The drive module generates the electromagnetic force as described in the compression-molding method for the permanent magnet according to Embodiment 1 above to drive the compression tool to apply the molding compression force to the magnetic powder under compression. The orientation coil is sleeved on the outer periphery of the mold to generate the orientation magnetic field as described in the compression-molding method for the permanent magnet according to Embodiment 1 above.

The drive module includes: two drive coils, one drive coil, or one drive coil and one drive plate. The drive module is configured to generate a transient magnetic field by passing into a transient current, generate an electromagnetic force when used with a drive plate, or, when not used with a drive plate, generates an electromagnetic force mutually attractive with the orientation coil. The magnitude of the electromagnetic force is adjusted by changing the peak value of the transient current. When the drive plate is adopted, the drive coil generates a transient magnetic field by using the transient current. With the transient magnetic field, an induction eddy current is generated in the drive plate. Accordingly, an electromagnetic force is generated to drive the compression tool to move. When a current is passed into the orientation coil, the orientation coil generates the orientation magnetic field, and the intensity of the magnetic field is adjusted by changing the peak value of the current. The compression tool is configured for use with the drive plate or the drive coil and compresses the magnetic powder. The mold is configured to be filled with the magnetic powder and used with the compression tool to mold the permanent magnet.

The drive coil and the orientation coil are both hollow spiral coils. The orientation coil is fixed to the base, and the drive coil is coaxial with the orientation coil. The drive plate may be a metal plate or a metal ring with high conductivity. In addition, the drive plate and the drive coil are close but not connected with each other. The cross-section of the compression tool in the axial direction is in a T shape. The radius of the bottom of the compression tool is smaller than the inner diameter of the orientation coil. The top of the compression tool is connected with the drive plate or is directly connected with the drive coil. The mold is fixed onto the base and located at the center of the magnetic field orientation coil. The outer diameter of the mold is smaller than the inner diameter of the magnetic field orientation coil. The groove is opened at the top of the mold. The size of the groove matches the compression tool. In addition, the magnetic powder may be placed in the groove.

Relevant technical solutions are same as those of Embodiment 1 and therefore will not be repeated in the following.

Those skilled in the art shall understand that the above descriptions are merely exemplary embodiments of the invention, and shall not be construed as limitations on the invention. Any modification, equivalent replacement and improvement made within the spirit and principle of the present invention shall be included in the protection scope of the present invention.

What is claimed is:

1. A compression-molding device for a permanent magnet, comprising a drive coil, a compression tool, a mold, and an orientation coil, wherein a groove configured to be filled with magnetic powder under compression is provided at a center of the mold, and a bottom of the compression tool contacts the magnetic powder under compression, a top of the compression tool contacts an end of the drive coil, and the compression tool coincides with a central axis of the groove, wherein the drive coil is configured to generate an electromagnetic force, so as to drive the compression tool to apply a molding compression force to the magnetic powder under compression, the orientation coil is sleeved on an outer periphery of the mold to generate an orientation magnetic field, wherein the drive coil generates the electromagnetic force when a transient current is passed into the drive coil, so as to apply a molding compression force to the magnetic powder under compression, and the orientation coil generates the orientation magnetic field when the transient current is passed into the orientation coil, thereby providing the magnetic powder under compression with an anisotropic property, and wherein the transient currents synchronously pass to the drive coil and the orientation coil to synchronously generate the electromagnetic force and the orientation magnetic field, thereby completing compression-molding of the permanent magnet, wherein a magnitude of the electromagnetic force and an intensity of the orientation magnetic field are respectively changed by changing peak values of the transient currents.

2. The compression-molding device as claimed in claim 1, wherein the drive coil comprises two drive coil sets, in a compression process, transient currents passed into the two drive coil sets are in opposite directions, so that an electromagnetic repulsive force is generated between the two drive coil sets, and the repulsive force drives one of the drive coil sets to drive the compression tool to apply the molding compression force to the magnetic powder under compression.

3. The compression-molding device as claimed in claim 1, wherein the drive coil is a drive coil set, in a compression process, the transient currents synchronously passed into the drive coil set and the orientation coil are in a same direction, an electromagnetic attractive force is generated between the drive coil and the orientation coil, and the attractive force drives the drive coil set to drive the compression tool to apply the molding compression force to the magnetic powder under compression.

4. The compression-molding device as claimed in claim 1, wherein the drive coil is a drive coil set, a drive plate is provided on a side of the drive coil, in a compression process, when the transient current is passed into the drive coil set, an eddy current is generated in the drive plate, so that an electromagnetic repulsive force is generated between the drive coil set and the drive plate, thereby driving the compression tool to apply the molding compression force to the magnetic powder under compression.

5. The compression-molding device as claimed in claim 4, wherein the repulsive force drives the drive plate to drive the compression tool to apply the molding compression force to the magnetic powder under compression.

6. The compression-molding device as claimed in claim 4, wherein the repulsive force drives the drive coil set to drive the compression tool to apply the molding compression force to the magnetic powder under compression.

7. The compression-molding device as claimed in claim 6, wherein the transient currents synchronously passed into the drive coil set and the orientation coil are in a same direction, so that an attractive force is generated between the drive coil and the orientation coil, wherein the attractive force and the repulsive force jointly drive the drive coil set to drive the compression tool to provide the compression force to the magnetic powder under compression.

8. The compression-molding device as claimed in claim 2, wherein a cross-section of the compression tool in an axial direction is in a T shape, and a bottom of the T shape contacts the magnetic powder under compression.

9. The compression-molding device as claimed in claim 8, wherein the drive coil and the orientation coil are both hollow spiral coils and are arranged on a same central axis, wherein the orientation coil is sleeved on an outer periphery of the magnetic powder under compression.

* * * * *